(12) United States Patent
Katiyar et al.

(10) Patent No.: US 11,740,977 B2
(45) Date of Patent: Aug. 29, 2023

(54) EFFICIENT DEDUPLICATION BASED FILE MOVEMENT FOR LOAD BALANCING IN A SCALED-OUT BACKUP SYSTEM

(71) Applicant: EMC IP Holding Company LLC, Hopkinton, MA (US)

(72) Inventors: Alok Katiyar, Santa Clara, CA (US); Srisailendra Yallapragada, Cupertino, CA (US); Chetan Risbud, Milpitas, CA (US); Sanjay Vedanthan, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 322 days.

(21) Appl. No.: 16/773,906

(22) Filed: Jan. 27, 2020

(65) Prior Publication Data

US 2021/0232459 A1 Jul. 29, 2021

(51) Int. Cl.
*G06F 11/14* (2006.01)
*G06F 16/174* (2019.01)
*G06F 16/22* (2019.01)
*G06F 16/2457* (2019.01)
*G06F 16/21* (2019.01)
(Continued)

(52) U.S. Cl.
CPC ...... *G06F 11/1453* (2013.01); *G06F 11/1451* (2013.01); *G06F 11/1464* (2013.01); *G06F 11/1469* (2013.01); *G06F 11/3034* (2013.01); *G06F 16/128* (2019.01); *G06F 16/1748* (2019.01); *G06F 16/219* (2019.01); *G06F 16/2246* (2019.01); *G06F 16/24573* (2019.01)

(58) Field of Classification Search
CPC ............ G06F 11/1453; G06F 11/1451; G06F 11/1464; G06F 11/1469; G06F 11/3034; G06F 16/128; G06F 16/1748; G06F 16/219; G06F 16/2246; G06F 16/24573; G06F 2201/815; G06F 11/1448
USPC ........................................................ 711/162
See application file for complete search history.

(56) References Cited

U.S. PATENT DOCUMENTS

| 9,588,977 B1 * | 3/2017 | Wang ...................... G06F 16/13 |
| 2013/0254339 A1 * | 9/2013 | Schilders .............. H04L 63/123 |
| | | 709/217 |

(Continued)

FOREIGN PATENT DOCUMENTS

EP 0278313 B1 * 8/1994 ......... G06F 16/1774

*Primary Examiner* — Gautam Sain
*Assistant Examiner* — Wei Ma
(74) *Attorney, Agent, or Firm* — Staniford Tomita LLP

(57) ABSTRACT

Embodiments for balancing cloud resource capacity for cross-node movement of files in a scaled out backup system, and for dynamically allocating cloud storage resources in a multi-node network having a file system. A process determines a destination node with dedicated cloud storage capable of storing a file selected for long term retention. It transfers the file to the cloud storage of the destination node while maintaining metadata of the file in the cloud tier local storage of the destination node, such as by using remote procedure calls between the destination and source nodes. It then updates a global namespace of the file system with a handle indicating a current location of the file as the cloud storage of the destination file, thus allowing access to the file through the metadata stored in the local storage of the source node.

11 Claims, 6 Drawing Sheets

(51) Int. Cl.
    *G06F 16/11*     (2019.01)
    *G06F 11/30*     (2006.01)

(56) References Cited

U.S. PATENT DOCUMENTS

| | | | |
|---|---|---|---|
| 2014/0006465 A1* | 1/2014 | Davis | G06F 16/183 |
| | | | 707/827 |
| 2017/0235950 A1* | 8/2017 | Gopalapura Venkatesh | |
| | | | G06F 11/1464 |
| | | | 726/24 |
| 2018/0232174 A1* | 8/2018 | Zhou | G06F 3/061 |
| 2018/0275902 A1* | 9/2018 | Monday | G06F 3/0632 |
| 2018/0373615 A1* | 12/2018 | Xia | G06F 3/065 |
| 2020/0012574 A1* | 1/2020 | Srinivasan | G06F 16/178 |

\* cited by examiner

EFFICIENT DEDUPLICATION BASED FILE MOVEMENT FOR LOAD BALANCING IN A SCALED-OUT BACKUP SYSTEM

TECHNICAL FIELD

This invention relates generally to clustered networks and balancing the capacity of cloud storage when moving files to the cloud in a deduplication clustered backup system.

BACKGROUND OF THE INVENTION

Cloud computing provides a shared pool of configurable computing resources (e.g., computer networks, servers, storage, applications and services) that can be rapidly provisioned and released with minimal management effort. Cloud computing allows users with various capabilities to store and process their data in either a private cloud or public cloud (e.g., third-party owned cloud network) in order to make data access much more easy and reliable. Cloud networks are widely used for large-scale data backup operations by enterprises that process large amounts of data on a regular basis, such as weekly or daily company-wide backups. Cloud storage (the "cloud tier") is typically associated with long-term storage of data that is stored for archival purposes, while local storage (the "active tier") is associated with presently processed data.

Data backup systems often enable customers to move data for long term storage to object storage provided by different cloud providers. This data can be read back from the cloud to the local storage of the node in case of a disaster. In a scaled-out environment, the filesystem namespace is distributed across different nodes while appearing as a single logical namespace to the end user. Each of these nodes has individual storage, compute and cloud capacity attached to them.

When moving eligible data for long term retention to the cloud for such a distributed namespace, it becomes imperative that the cloud capacity attached to each of these nodes is effectively utilized. Present systems apportion cloud resources to each node in a rigid fixed allocation. Nodes are not able to use excess cloud capacity assigned to other nodes, and thus cannot utilize available cloud storage if their own allocation is exhausted and/or their cloud access fails.

What is needed therefore, is a way to dynamically apportion cloud resources among nodes in a cluster system, and to efficiently balance the capacity and resources of cloud storage during file movement in scale-out backup systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
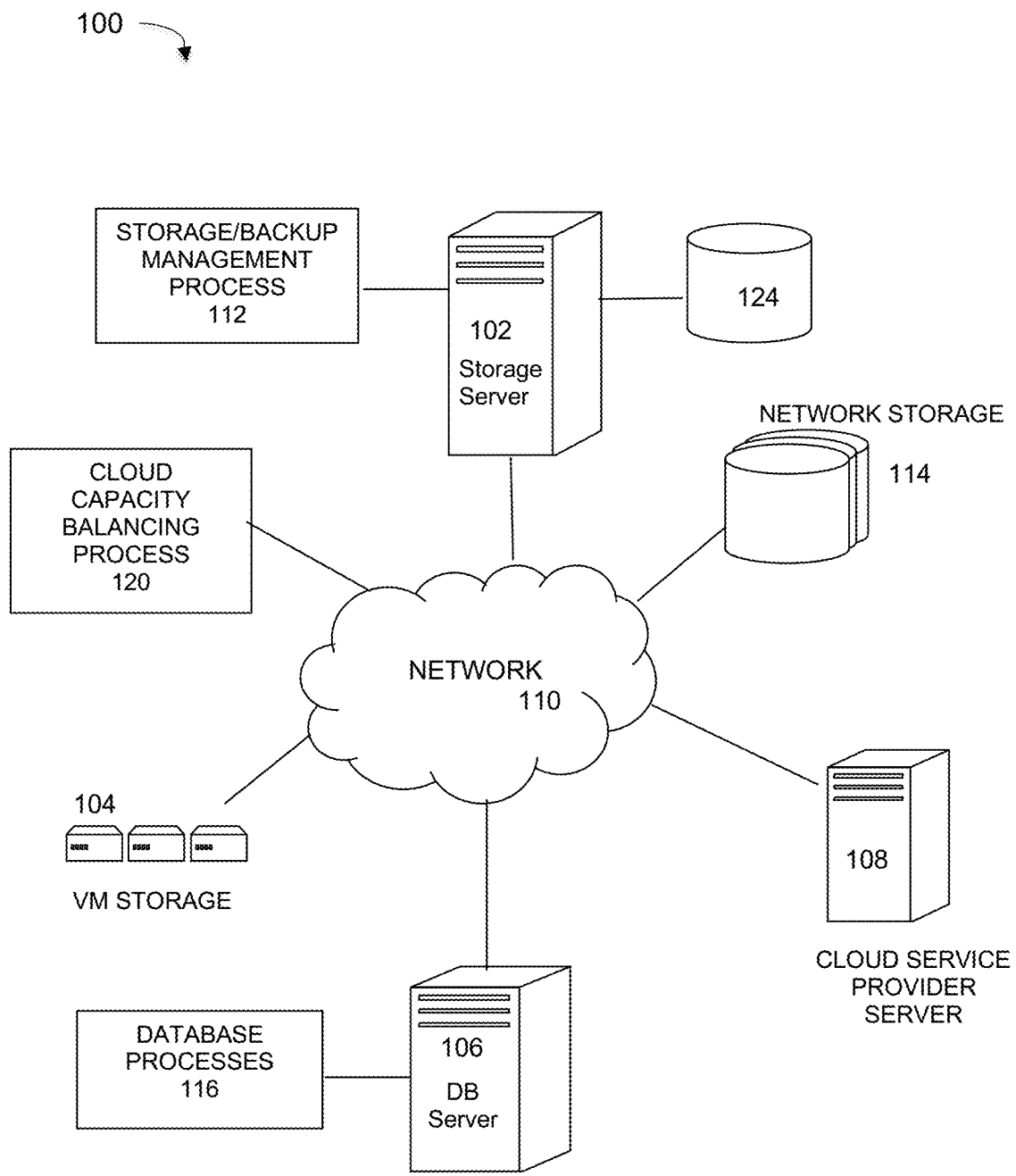
FIG. 1 is a diagram of a cloud computing network implementing a dynamic, cloud capacity balancing process for moving files in a deduplication storage system, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for efficiently balancing the capacity of cloud resources when moving files to a cloud tier in scaled-out, deduplication backup systems. FIG. 1 illustrates a computer network system that implements one or more embodiments of a cloud storage network system implementing a cloud-tier capacity balancing process 120, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 106, in the network environment. The data sourced by the data source may be any appropriate data, such as database data that is part of a database management system, and the data may reside on one or more hard drives for the database(s) in a variety of formats. Thus, data source 106 maybe a database server executing one or more database processes 116, or it may be any other sources data for use by the resources of network 100.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, cloud network 110 may be a private network or it may be a public network provided by a third-party cloud service provider (CSP). In this case, at least part of the infrastructure of network 110, such as servers, routers, interfaces and so on are provided to users such as storage server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider. Such resources and resource allocations represent capacity that is available for use by subscribed users. Such users may be represented by individual nodes or groups of nodes in the system managed by one or more individual entities.

Cloud resources are typically presented to users by cloud service providers as certain amounts of storage capacity, network bandwidth, and computing power for certain periods of time, and may be actually be embodied as disparate hardware (e.g., storage media, routers, CPU's, etc.) within an overall cloud network 110. The example cloud service provider server 108 may maintained be any company such as Amazon, EMC, Apple, Cisco, Citrix, IBM, Google, Microsoft, Salesforce.com, and so on. Depending on implementation, each cloud provider may show up as a cloud tier inside the file system for the user, such as the Data Domain file system. The cloud tier may have one or more cloud units that are used for data migration and storage using migration, copying, duplication, long-term retention (LTR), and other processes.

The cloud tier contains certain resources, such as storage media, computing resources, and intra-cluster data transmission bandwidth, among other similar resources. For better, more balanced utilization of resources, cloud capacity balancing process 120 facilitates the moving of files residing on the storage of one node to the cloud capacity attached to another node in a multi-node network system. In an embodiment, certain deduplication-based mechanisms are used to achieve such a movement effectively. Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication. Certain deduplication file systems (e.g., EMC Data Domain) implement a multi-tiered deduplication file system that allows files to be moved between cloud and active tiers, while maintaining one namespace.

For purposes of this description, cloud tier storage refers to network or cloud implemented storage media that is used to store data for archival or long-term storage purposes, and that imposes a cost in terms of provider fees and/or resource overhead to access. It may also comprise local storage to store metadata of the files (such as segment trees, e.g., FIG. 5 herein), as well as cloud storage media to which the actual data is moved. The active tier storage refers to storage that may be faster and smaller than cloud storage, but that is readily accessible and used for temporary storage or present processing of data. The location of a file is strictly binary in that it is either in the active tier or on the cloud tier. The operation to move files to the cloud tier is called cloud data movement, and the operation to get the file back from the cloud is called recall. The EMC Data Domain File System is an example of a multi-tiered deduplication file system that allows files to be moved between cloud storage and active storage tiers, while maintaining one namespace, where the cloud tier is typically associated with long-term storage of data and the active tier is associated with presently processed data.

Figure 2:
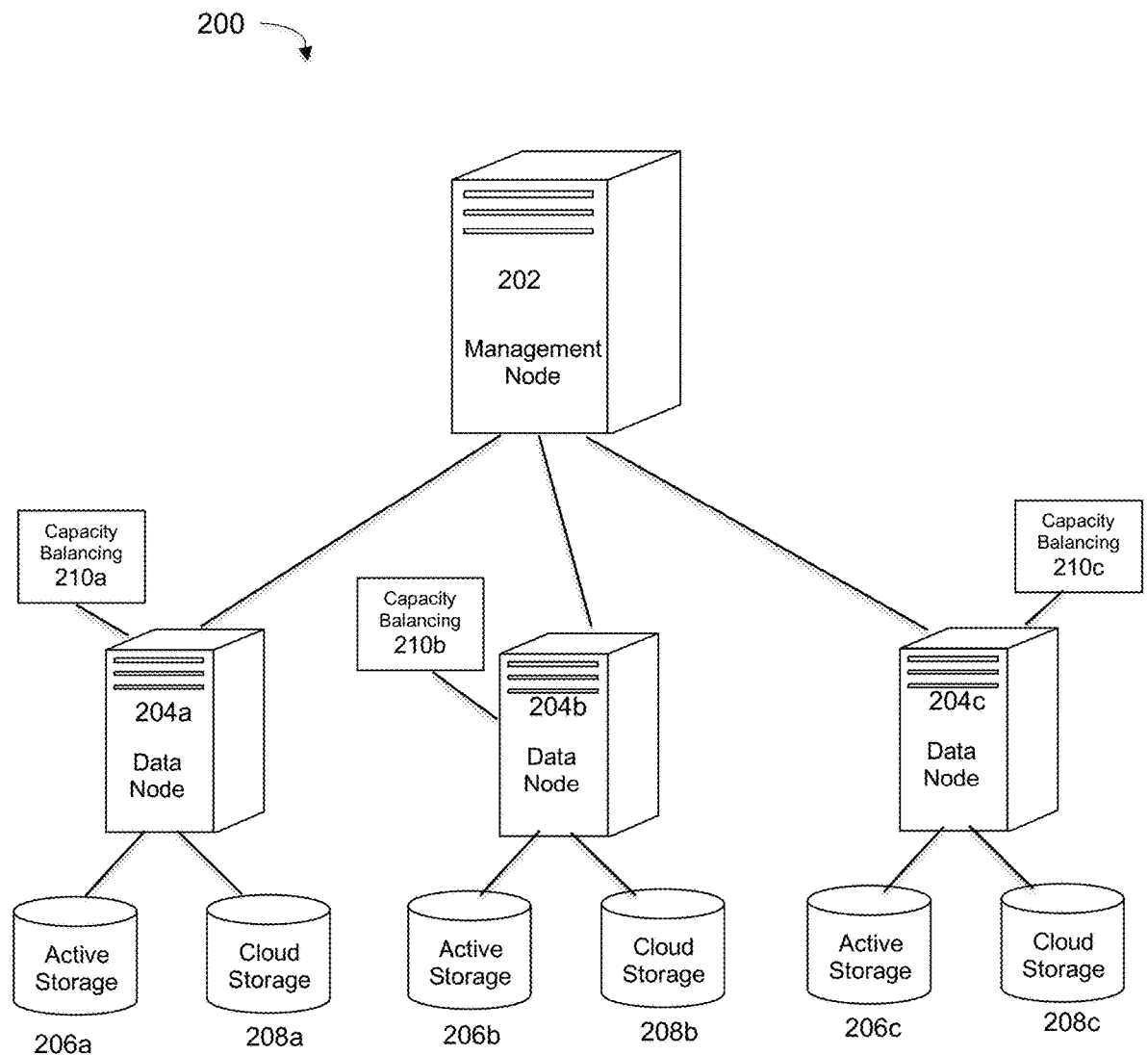
FIG. 2 illustrates a multi-node cluster system that represents a scaled-out system implementing a deduplication backup process, under some embodiments.

The network system 100 of FIG. 1 may be part of a multi-node cluster system. In general, a cluster system is a computer network system that has a number of computers or nodes that perform certain tasks. One common type of multi-node cluster setup (e.g., Hadoop) has a master-slave architecture in which one server acts as a master node, while other computers act as worker nodes to store data and perform computations. FIG. 2 illustrates a multi-node cluster system that represents a scaled-out system implementing a deduplication backup process, under some embodiments. As shown in FIG. 2, network 200 comprises a management node 202 that is coupled to a number of individual data nodes denoted 204a, 204b, and 204c. Any practical number N of data nodes may be coupled to a management node 202 (i.e., 204a to 204n). Each data node has certain processing resources to perform computations on data. Each data node also has access to respective local storage media that is used as active storage, as denoted 206a, 206b, and 206c. Such active storage is typically used for frequently or most recently used data. For long term storage, each data node has access to respective portions of cloud storage, as denoted 208a, 208b, and 208c. Such cloud storage represents an assigned or dedicated portion of large-scale storage media that is provided by the cloud network 110 through one or more cloud providers 108, as well as some local storage for storing the file metadata. The cloud resources apportioned to each node may be the same amount of storage, or it may be different for different nodes depending on system configuration, cloud subscription levels, and so on.

As stated in the Background section, in a scaled-out environment, such as network 200, the filesystem namespace is distributed across different nodes while appearing as a single logical namespace to the user. Each of these nodes has or has attached to it compute resources, individual storage (206x), and cloud storage capacity (208x). When moving eligible data for long term retention to the cloud for such a distributed namespace, it becomes imperative that the cloud capacity attached to each of these nodes is effectively utilized. For more efficient and balanced utilization of all cloud resources, such as cloud storage, processors, and intra-cluster bandwidth, each data node executes a cloud capacity balancing process 120. For the embodiment of FIG. 2, each data node 204a-c, executes a respective cloud capacity balancing process, as denoted 210a, 210b, and 210c.

In present systems, cloud storage is usually assigned to each node as a fixed allocation, such as based on a subscription or payment level. Nodes often under-utilize their respective allocation, and sometimes require more long term storage than they are allocated. Embodiments of the cloud capacity balancing process implement a dynamic allocation model in which surplus or under-utilized cloud storage capacity assigned to one node is used by another node based on the need of that node. The node resident balancing processes 210a-c facilitates the moving of files residing on the storage of one node to the cloud capacity attached to another node in a multi-node system. This represents a dynamic cloud storage allocation for cross-node file movement, and is particularly advantageous when the cloud capacity of a current node has been exhausted, or if the cloud storage for a node has become unavailable such as due to network interruption or some other problem. In this case providing such a functionality results in an uninterrupted movement of files to the cloud if any one of the nodes in the cluster has an unexhausted or spare cloud capacity. Such a process also provides advantages when files are brought back from the cloud as it leads to better and balanced local storage utilization for the cluster nodes overall. Once the file movement has been accomplished, appropriate namespace entries are updated to reflect the current location of the file. Such a movement should also take care of any encryption that may be enforced for data to be sent to the object store/cloud.

Figure 3:
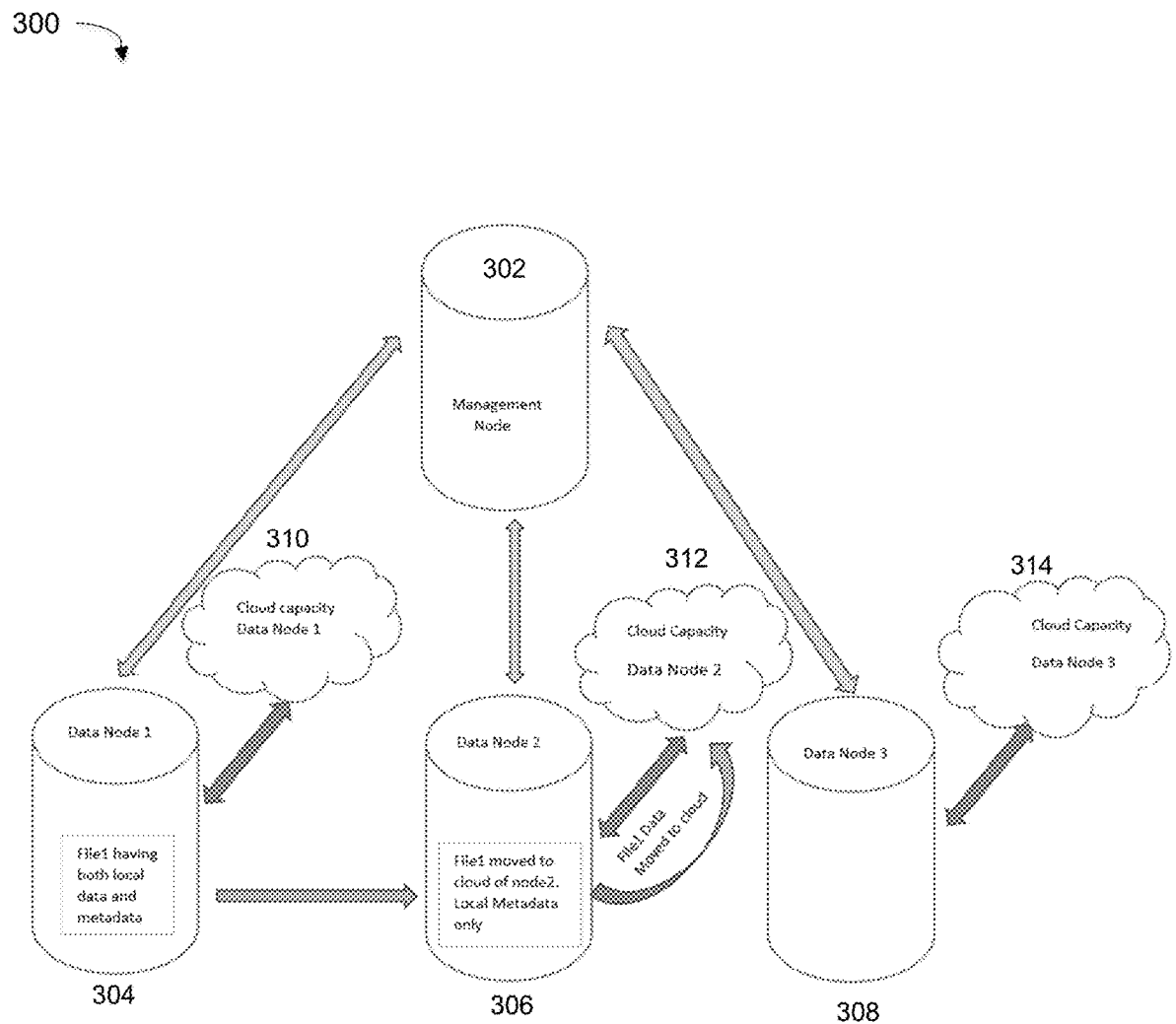
FIG. 3 illustrates an example of file movement between cloud storage resources in a multi-node network, under some embodiments.

FIG. 3 illustrates an example of file movement between cloud storage resources in a multi-node network, under some embodiments. As shown in diagram 300, a management node 302 controls three data nodes 304, 306, and 308, denoted data node 1, data node 2, and data node 3. There is also cloud capacity 310, 312, and 314 associated with each data node. Such cloud capacity for each data node may represent long-term retention or storage provided by cloud providers, such as Amazon (e.g., Amazon Web Services, AWS) or Microsoft Azure, or any other public or private cloud provider, such as ECS. The management node 302 generally handles the configuration of the system 300 and the data nodes in a virtualized system. The number of nodes can vary, but in an example system is four nodes per management node. More nodes can be included based on the NVRAM capacity, but certain performance parameters may be impacted.

For the example of FIG. 3, a file (File1) in data node 1 (304) having both locally stored data and metadata is to be moved to cloud storage for long term retention, however, the cloud capacity 310 for this node is exhausted. This data is thus moved to data node 2 (306) so that its excess cloud capacity 312 can be used. Thus, the File1 data is moved to the cloud through data node 2's cloud capacity 312. This file transfer mechanism leads to a balanced and efficient utilization of the cloud capacity attached to different nodes in the cluster. It also ensures that only unique data is sent to the cloud attached to the destination node, thereby lowering cloud charges. It also ensures that cloud data movement continues uninterrupted in the cluster if any of the nodes in the cluster has some unutilized cloud capacity.

In an embodiment of FIG. 3 in which the system 300 is a Data Domain backup system, each node 304, 306, and 308 are different Data Domains. Communication between these nodes is thus done through remote procedure calls (RPCs), as will be explained in greater detail below.

Figure 4:
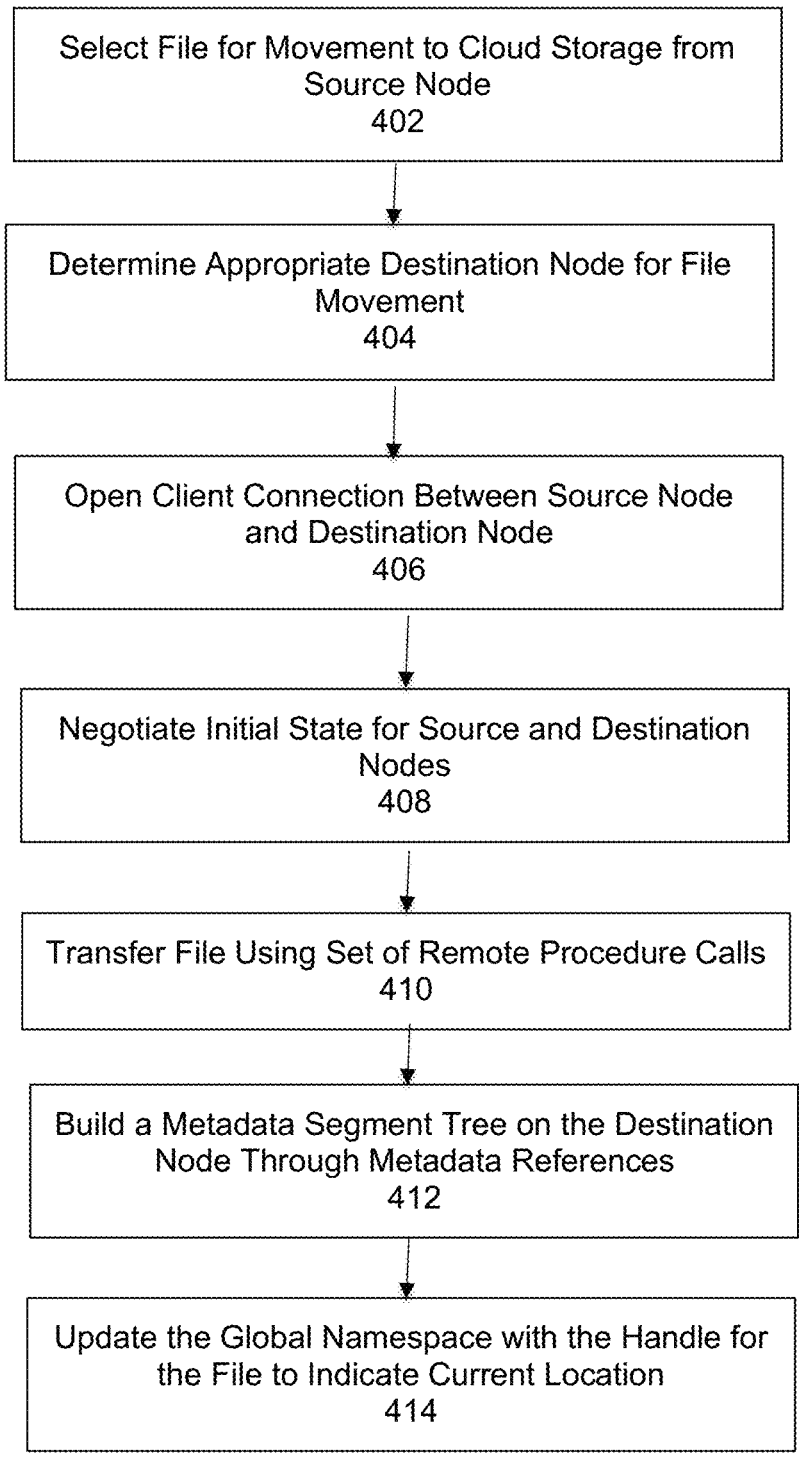
FIG. 4 is a flowchart that illustrates an overall process of dynamically adding cloud capacity for cross-node file movement in a multi-node system, under some embodiments.

FIG. 4 is a flowchart that illustrates an overall process of dynamically adding cloud capacity for cross-node file movement in a multi-node system, under some embodiments. In such a process, data is directly being moved to the cloud via the destination node. Data generally never actually lands on the destination node. However the metadata (e.g., segment tree of FIG. 5) is built up during this transfer and is persisted on the destination node. Process 400 of FIG. 4 begins with the selection of a file for movement to cloud storage from a particular node, called the "source node." The file selected in step 402 may be one that is marked for long term storage, such as due to an age of its data (e.g., over one month or one year old), or that is determined to have data suitable for archiving. If it is determined that this node's cloud storage is full or otherwise unavailable (e.g., through cloud network transmission failure), it will be marked as a file that is to be transferred to the cloud using another node's cloud storage. Once a file has been marked for movement to the cloud an appropriate target node is determined, 404.

In an embodiment, the appropriate target node is identified by an internal data movement to cloud process, such as a file migration to cloud (FMIG) process. This is a cluster-wide process that keeps track of the cloud capacity for each node, and knows which files have already been moved to target nodes. This allows for optimum utilization of files based on deduplication performance and/or hierarchical or locale relationships. In an embodiment, such a feature is part of the Data Domain system, and other similar file movement schemes that follow a simple round-robin file movement can be used. Other or future implementation of FMIG may employ user configurable file movement policies, and other policies other than round robin schemes.

A connection is then opened between the source and the destination nodes, 406. Once this connection is opened, the nodes will negotiate an initial state as well as do the initial preparatory work for the file transfer, 408. This preparatory step includes opening of a new file on the destination node. For a file that must be moved to the cloud storage attached to the destination node, the file metadata (which occupies much smaller storage space than the file data) will be kept on the local storage for the cloud tier of the destination node, this metadata points to the actual file data which will be moved to the destination node's cloud storage. Files which are stored on the local system have different shelves of disk to store the metadata than the shelves for storing metadata belonging to the files which have been moved to the cloud. This actual file metadata could be maintained in a tree or any other format as might have been implemented in the file system. The metadata generally represents or embodies information about the data processed and stored in the nodes of the file system. Metadata includes elements such as the length of a file, where on disk a given piece of data is stored, which blocks on disk are used/free and so on.

Figure 5:
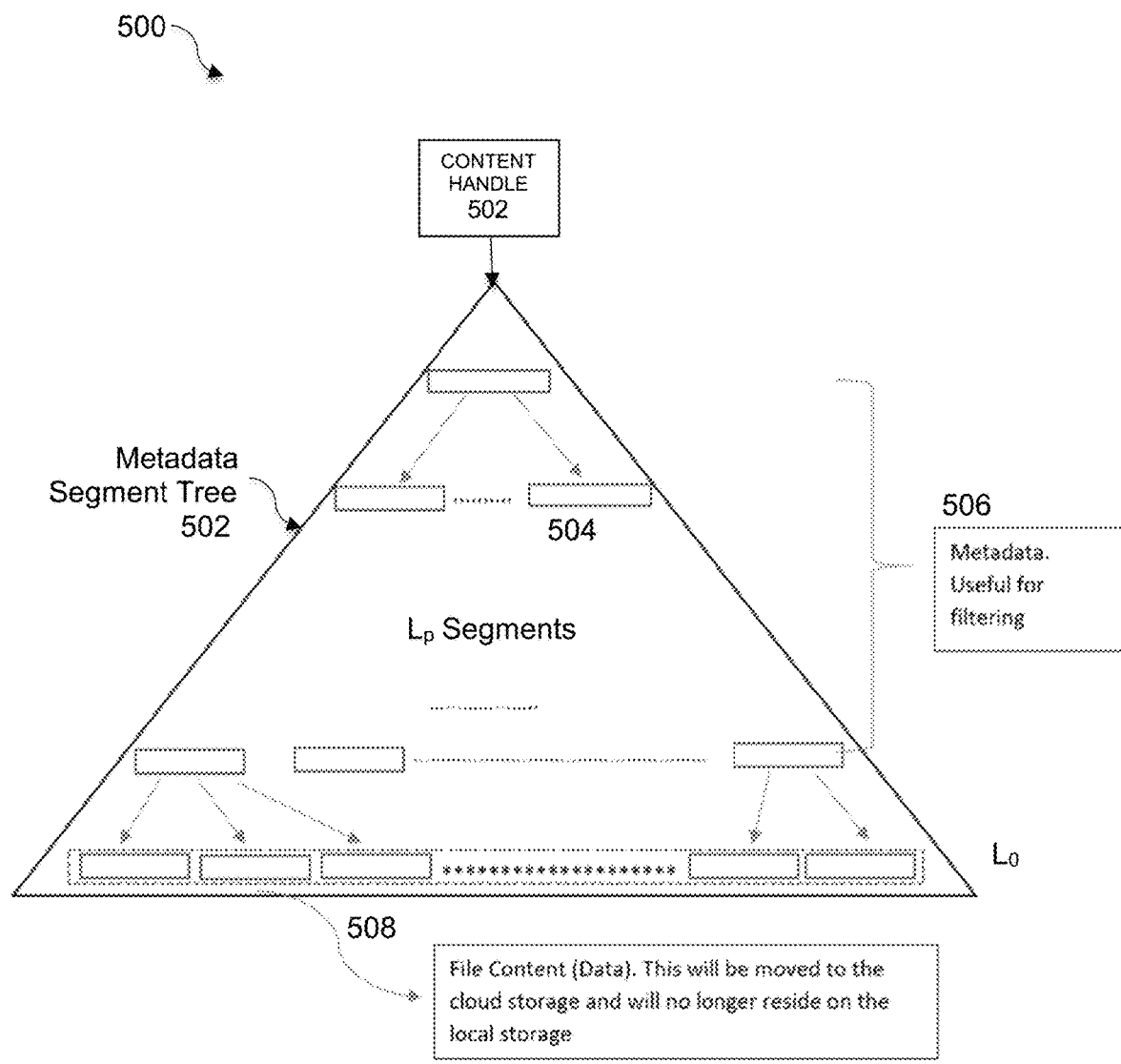
FIG. 5 illustrates file metadata organized in a tree structure, under some embodiments.

FIG. 5 illustrates file metadata organized in a tree structure, under some embodiments. As shown in FIG. 5, the file metadata 506 is maintained in a segment tree 502. The metadata 506 is comprises of individual (Lp) segments 504 organized hierarchically down to the data segments 508. The file content comprises the leaf nodes of tree 502 and are called L0 segments. The fingerprints of a group of L0 segments for the file content 508 successively increasing metadata segments 506. Thus, the L0 segments are collected in the L1 segments, the fingerprint of a group of L1 segments, is in a L2 segment and so on till L6, which may be pointed to by a super segment, which is pointed to by a content handle 502. As shown in diagram 500, the content handle 502 points to a specific version of the file data 508.

In an embodiment, this content handle is then put in the inode. As is known by Unix users, an inode (Index Node) contains standard file attributes that are needed for all files, such as file ownership, file permissions, file times (creation, access, modification), file size and so on. The metadata tree stays in the source node, while the data is moved to the cloud storage of the destination node, and will not reside on the local (active) storage of the source node. Such a mechanism helps in recalling appropriate chunks of the files from cloud, as well as helps in the deduplication thereby ensuring that only unique data is sent to the cloud (avoid sending any data already sent).

With respect to the metadata tree, when a file whose contents have been moved to the cloud and is closed thereafter, its metadata is stored as a tree of segments in local storage for the cloud tier. Segments in the tree are arranged in levels, which are numbered from the bottom up, starting with 0. Thus, level i is denoted as Li, which an arbitrary level higher than 0 as Lp, and an arbitrary level higher than 1 as Lq, i.e., Lp subsumes Lq. An L0 segment point to an object in the cloud which is the actual file data. An Lp segment contains fingerprints of its child segments. These Lp segments help in traversing and fetching data between to two different file offsets. A special type of segment called the super segment contains the identifier (ID) of the top segment in the tree and some file information. The content handle for the file contains the ID of the super segment.

The metadata of FIG. 5 is used in conjunction with deduplication mechanisms (e.g., of process 112 in system 100) in the overall system. In general, since the system is a deduplication-based backup system, a lot of the file content may have already been present on the cloud capacity attached to the destination node due to the previous backups having been moved to the cloud attached to the node. In this case, sending of the entire file might be a waste of intra-cluster bandwidth, as well as might result in higher cloud storage utilization due to writing of duplicate data. Thus, instead of sending the entire file, the process sends references to file data chunks (could be a SHA or any other hash value), which will consume much smaller bandwidth than sending the entire chunk itself. The destination node will then in turn compare these hash values/references with the metadata of the files which have been moved to the cloud tier and respond back to the source system with the list of references corresponding to which data chunks have not been moved to the cloud. The local metadata for the file, as implemented in a tree 502 or any other format, will be built using the references that were sent to the destination node and the source nodes will respond with the missing data chunks which will be moved to the cloud storage using the REST-based (or similar) interfaces provided by the cloud provider while the metadata will remain on the local storage of the source node and also on the destination node.

With reference back to FIG. 4, once the initial state sharing is done and information about any encryption to be used while the file is transferred, the actual process of file transfer begins, 410. Thus, once the connection is opened between the source and destination nodes, this connection will be used to send the file to the cloud storage attached to the destination node. The file data is moved to the cloud storage via the REST API's exposed by the cloud provider, and a metadata tree is constructed which resides on the local storage for the cloud tier.

In an embodiment, such as when the system is a Data Domain system, the files are transferred using a set of Remote Procedure Calls (RPCs), 410. The RPC's may be:

Open, Associate, Transfer, and Close Connection. Operation of these example RPC's is provided as follows:

(1) filecopy_associate: This RPC exchanges the state between the two nodes (source and destination). Parameters, such as whether over the wire encryption is needed or not, whether the actual data is to be encrypted and sent, and the encryption key to be used for such encryption will be interchanged during this RPC.

(2) filecopy_open_file_remote_node: This RPC takes care of opening the file on the remote (destination node) cloud tier and generating an intermediate handle which will be used as an identifier for the subsequent file movement to the cloud. This RPC also performs sanity checks like verifying that the cloud on the destination node available, the cloud having ample available space for moving the incoming file and returning the corresponding status back to the source node from which the file movement is being triggered.

(3) file_transfer: The file transfer process is actually achieved through three different sub-RPCs:
(a) send_refs: this RPC sends the metadata of the files chunks (a SHA1 hash) instead of the actual data.
(b) recv_refs: this RPC will return the list of file chunks which are not present in the destination node cloud storage. This list is generated by searching for the chunks corresponding to the refs sent by the send_refs RPC above.
(c) send_segs: this RPC send the actual file segments for the references (metadata) received by the recv_refs above. A combination of the a, b and c sub-RPCs ensures that only unique data is written to the destination node's cloud storage.

4) filecopy_close_file_remote_node: This RPC closes the destination file. This ensures the contents are flushed to the cloud and the handle thus generated is persisted in the namespace.

With reference back to FIG. 4, the process also builds a metadata segment tree on the destination node through metadata references, 412. This step uses the process described above wherein the file metadata is kept on the local storage for the cloud tier of the destination node, and points to the actual file data which will be moved to the destination cloud storage. Once the file transfer 410 is complete the global namespace will be updated with the content handle for such a file and will indicate the current location of the file, 414. This content handle corresponds to the content handle 502 for the metadata of the file, which is still stored in the source node's active storage. Any user accessing this file will be directed from the source node through referencing the locally stored content handle 502, to the actual file data stored in the cloud storage of the destination node. Such redirection is generally transparent to the user, who will be unaware of the storage of the file in another node's cloud storage. Similarly, in case of a need to access the moved file, using the metadata information present on the local storage appropriate objects can be read from the cloud thereby reconstructing the entire file.

Embodiments thus provide for balancing cloud resource capacity for cross-node movement of files in a scaled out backup system by determining a destination node with dedicated cloud storage capable of storing a file selected for long term retention. It transfers the file to the cloud storage of the destination node, such as by using remote procedure calls between the destination and source nodes. The metadata is reconstructed on the destination node. The namespace, however, has a copy of the content handle pointing to the metadata Mtree, which allows any user to access this file without the user having to know or be concerned with the actual location of the file. The process then updates a global namespace of the file system with a handle indicating a current location of the file as the cloud storage of the destination file, thus allowing access to the file through the metadata stored in the local storage of the source node. A method thus determines a destination node of the multi-node network with dedicated cloud storage capable of storing a file selected for long term retention, in local storage of a source node of the multi-node network, transfers the file directly to the dedicated cloud storage without storing on a local storage of the destination node, builds a metadata segment tree on the destination node through metadata references, and updates a global namespace of the file system with a handle indicating a current location of the file as the dedicated cloud storage of the destination file through the metadata segment tree, the handle allowing access to the file through the metadata stored in the local storage of the source node.

Embodiments further provide for dynamic allocation of cloud storage resources in a multi-node network in which each node maintains respective active storage and an assigned cloud storage partition by determining an amount of cloud storage assigned to each node of the multi-node network, receiving a request to transfer a file from local storage of a source node to a cloud storage of the source node, receiving an indication that the cloud storage of the source node is unavailable for storing the file, identifying a target node of the other nodes of the multi-node network with cloud storage available to store the file, transferring the file from the local storage of the source node to the cloud storage of the target node, and updating a global namespace of a file system of the multi-node network to point to the file in the cloud storage of the target node.

System Implementation

Embodiments of the processes and techniques described above can be implemented on any appropriate backup system operating environment or file system, or network server system. Such embodiments may include other or alternative data structures or definitions as needed or appropriate.

Figure 6:
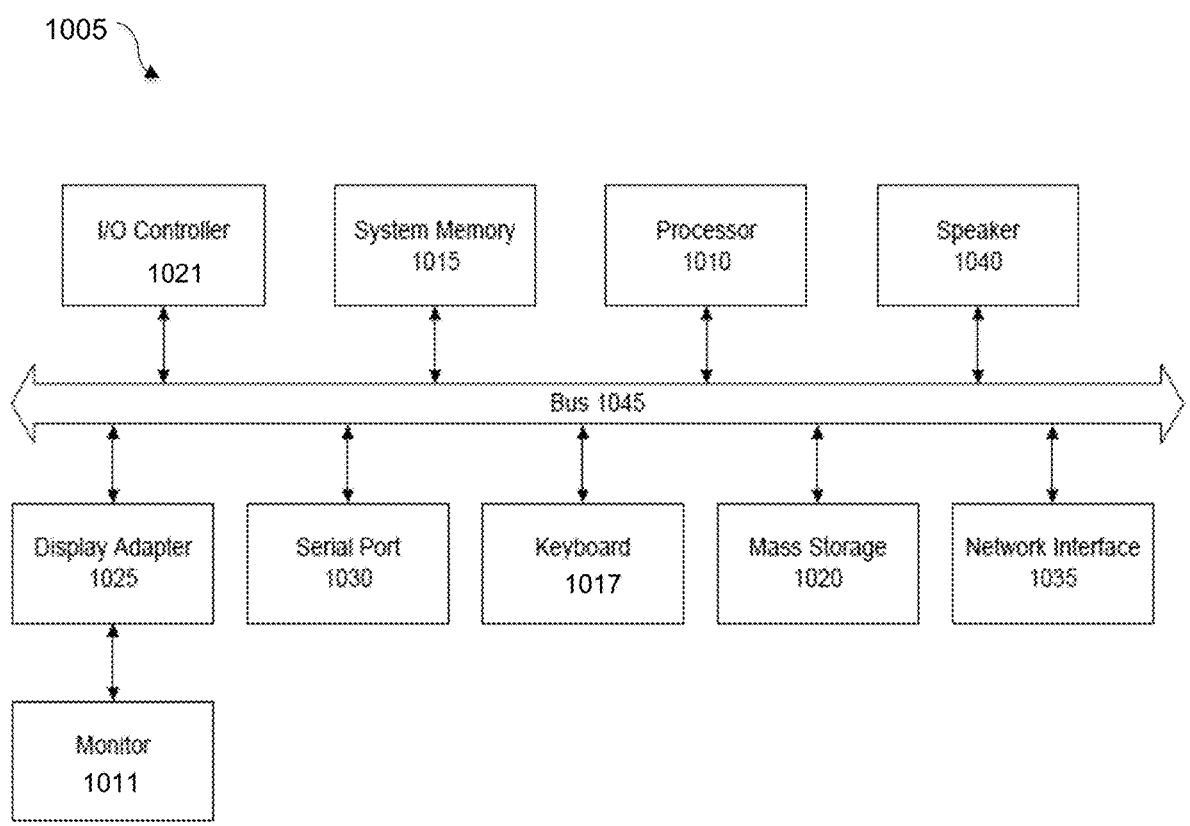
FIG. 6 is a system block diagram of a computer system used to execute one or more software components of a dynamic apportionment process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 6 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 7 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of dynamically balancing cloud resource capacity in a multi-node network having a file system, comprising:

providing a deduplication backup system comprising a backup server;

determining, through a cluster-wide file migration to cloud (FMIG) process that is internal to the deduplication backup system, a destination node of the multi-node network with dedicated cloud storage capable of storing a file selected for long term retention, in a local storage of a source node of the multi-node network;

negotiating an initial state of the source node and the destination node through a state sharing process of initial preparatory work including opening a new file on the destination node and storing file metadata on the local storage for a cloud tier of the destination node, wherein the metadata points to actual file data to be moved to the dedicated cloud storage;

associating a current cloud capacity to each respective node of the multi-node network;

transferring the file directly to the dedicated cloud storage without storing the actual file data on the local storage of the destination node, when a current cloud capacity of the destination node is adequate, otherwise transferring the file to cloud storage of a different node having sufficient cloud capacity to balance utilization of cloud storage among nodes of the multi-node network;

building and persisting, during the transferring step, a metadata segment tree on the destination node through metadata references for file data marked for long-term storage;

storing the metadata tree on the source node without storing the metadata in the cloud storage, wherein the transferring step uses deduplication processes of the backup server to prevent unnecessary copying of files already moved to the cloud storage by comparing data references from the metadata segment tree on the destination node to metadata stored in a tree for files that have been moved to the cloud storage;

sending, from the destination node to the source node, a list of references for data that is not moved to cloud storage for a metadata tree stored on the source node, wherein the source node responds to the destination node with any data that has not been previously moved to the cloud storage; and updating a global namespace of the file system with a handle indicating a current location of the file as the dedicated cloud storage of the destination file through the metadata segment tree, the handle allowing access to the file through the metadata stored in the local storage of the source node.

2. The method of claim 1 further comprising, prior to the transferring, opening a temporary file in the local storage of the destination node.

3. The method of claim 1 wherein the metadata stores attributes of the file selected from the group consisting of: file name, file type, file ownership, file permissions, creation/access/modification times, and file size.

4. The method of claim 3 wherein the metadata is maintained in a tree format having individual (Lp) segments organized hierarchically down to data segments comprising the file.

5. The method of claim 4 wherein the handle comprises a content handle of the metadata tree that points to a version corresponding to the current location of the file.

6. The method of claim 1 wherein the backup server executes a deduplication backup process executed running a Data Domain file system (DDFS).

7. The method of claim 6 wherein at least part of the multi-node network comprises a virtualized network, and the dedicated cloud storage comprises virtual storage implemented on one or more virtual machines in the network.

8. The method of claim 6 wherein each node comprises a data domain within the DDFS, and wherein the transferring is performed using a plurality of remote procedure calls between the source node and the destination node.

9. The method of claim 8 wherein the remote procedure calls comprise calls for: file open, file associate, file transfer, and close connection.

10. The method of claim 9 wherein the file transfer calls comprise sub-remote procedure calls comprising: "send references" causing transmission of metadata of file chunks instead of actual data, "receive references" causing a return of a list of file chunks that are not already present in the destination node dedicated cloud storage, and "send segments" which causes transmission of actual file segments returned by the "receive references" remote procedure call.

11. A computer program product, comprising a non-transitory computer-readable medium having a computer-readable program code embodied therein, the computer-readable program code adapted to be executed by one or more processors to implement a method of dynamically balancing cloud resource capacity in a multi-node network having a file system, by:
  providing a deduplication backup system comprising a backup server;
  determining, through a cluster-wide file migration to cloud (FMIG) process that is internal to the deduplication backup system, a destination node of the multi-node network with dedicated cloud storage capable of storing a file selected for long term retention, in a local storage of a source node of the multi-node network;
  negotiating an initial state of the source node and the destination node through a state sharing process of initial preparatory work including opening a new file on the destination node and storing file metadata on the local storage for a cloud tier of the destination node, wherein the metadata points to actual file data to be moved to the dedicated cloud storage;
  associating a current cloud capacity to each respective node of the multi-node network;
  transferring the file directly to the dedicated cloud storage without storing the actual file data on the local storage of the destination node, when a current cloud capacity of the destination node is adequate, otherwise transferring the file to cloud storage of a different node having sufficient cloud capacity to balance utilization of cloud storage among nodes of the multi-node network;
  building and persisting, during the transferring step, a metadata segment tree on the destination node through metadata references for file data marked for long-term storage;
  storing the metadata tree on the source node without storing the metadata in the cloud storage, wherein the transferring step uses deduplication processes of the backup server to prevent unnecessary copying of files already moved to the cloud storage by comparing data references from the metadata segment tree on the destination node to metadata stored in a tree for files that have been moved to the cloud storage;
  sending, from the destination node to the source node, a list of references for data that is not moved to cloud storage for a metadata tree stored on the source node, wherein the source node responds to the destination node with any data that has not been previously moved to the cloud storage; and
  updating a global namespace of the file system with a handle indicating a current location of the file as the dedicated cloud storage of the destination file through the metadata segment tree, the handle allowing access to the file through the metadata stored in the local storage of the source node.

* * * * *